US 8,966,205 B1

(12) United States Patent
Lo et al.

(10) Patent No.: US 8,966,205 B1
(45) Date of Patent: Feb. 24, 2015

(54) SYSTEM DATA MANAGEMENT USING GARBAGE COLLECTION AND HYBRID SELF MAPPING (75) Inventors: Jerry Lo, Hacienda Heights, CA (US); Frederick H. Adi, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 158 days.

(21) Appl. No.: 13/468,946

(22) Filed: May 10, 2012

(51) Int. Cl.
*G06F 12/00* (2006.01)

(52) U.S. Cl.
USPC .......................................................... 711/165

(58) Field of Classification Search
USPC .......................................................... 711/165
See application file for complete search history.

(56) References Cited

U.S. PATENT DOCUMENTS

| 5,835,955 | A | 11/1998 | Dornier et al. |
| 6,728,826 | B2 | 4/2004 | Kaki et al. |
| 6,856,556 | B1 | 2/2005 | Hajeck |
| 7,126,857 | B2 | 10/2006 | Hajeck |
| 7,212,440 | B2 | 5/2007 | Gorobets |
| 7,430,136 | B2 | 9/2008 | Merry, Jr. et al. |
| 7,447,807 | B1 | 11/2008 | Merry et al. |
| 7,502,256 | B2 | 3/2009 | Merry, Jr. et al. |
| 7,502,259 | B2 | 3/2009 | Gorobets |
| 7,509,441 | B1 | 3/2009 | Merry et al. |
| 7,596,643 | B2 | 9/2009 | Merry, Jr. et al. |
| 7,653,778 | B2 | 1/2010 | Merry, Jr. et al. |
| 7,685,337 | B2 | 3/2010 | Merry, Jr. et al. |
| 7,685,338 | B2 | 3/2010 | Merry, Jr. et al. |
| 7,685,374 | B2 | 3/2010 | Diggs et al. |
| 7,733,712 | B1 | 6/2010 | Walston et al. |
| 7,765,373 | B1 | 7/2010 | Merry et al. |
| 7,898,855 | B2 | 3/2011 | Merry, Jr. et al. |
| 7,912,991 | B1 | 3/2011 | Merry et al. |
| 7,913,061 | B2 | 3/2011 | Gorobets et al. |
| 7,936,603 | B2 | 5/2011 | Merry, Jr. et al. |
| 7,962,792 | B2 | 6/2011 | Diggs et al. |
| 8,078,918 | B2 | 12/2011 | Diggs et al. |
| 8,090,899 | B1 | 1/2012 | Syu |
| 8,095,851 | B2 | 1/2012 | Diggs et al. |
| 8,108,692 | B1 | 1/2012 | Merry et al. |
| 8,122,185 | B2 | 2/2012 | Merry, Jr. et al. |
| 8,127,048 | B1 | 2/2012 | Merry et al. |
| 8,135,903 | B1 | 3/2012 | Kan |
| 8,151,020 | B2 | 4/2012 | Merry, Jr. et al. |
| 8,161,227 | B1 | 4/2012 | Diggs et al. |
| 8,166,245 | B2 | 4/2012 | Diggs et al. |
| 8,194,340 | B1 | 6/2012 | Boyle et al. |
| 8,243,525 | B1 | 8/2012 | Kan |

(Continued)

OTHER PUBLICATIONS

U.S. Appl. No. 13/152,645, filed Jun. 3, 2011, to Call et al., 19 pages.

*Primary Examiner* — Charles Rones
*Assistant Examiner* — Nanci Wong (57) ABSTRACT

A data storage system is disclosed that utilizes garbage collection and hybrid self-mapping for managing system data. In one embodiment, a system data region having an amount of valid system data that is below a threshold is freed. Write amplification associated with managing and storing system data can be reduced at least in part because only valid system data can be copied during garbage collection of the selected region. Mapping information associating system data with physical locations in non-volatile storage where system data is stored can be generated, which can reduce system data reconstruction time during start-up of the data storage system. Increase in efficiency and reduction in startup and initialization time can be attained.

25 Claims, 8 Drawing Sheets

(56) References Cited

U.S. PATENT DOCUMENTS

| | | | |
|---|---|---|---|
| 8,254,172 | B1 | 8/2012 | Kan |
| 8,261,012 | B2 | 9/2012 | Kan |
| 8,296,625 | B2 | 10/2012 | Diggs et al. |
| 8,312,207 | B2 | 11/2012 | Merry, Jr. et al. |
| 8,316,176 | B1 | 11/2012 | Phan et al. |
| 8,341,339 | B1 | 12/2012 | Boyle et al. |
| 8,375,151 | B1 | 2/2013 | Kan |
| 8,392,635 | B2 | 3/2013 | Booth et al. |
| 8,397,107 | B1 | 3/2013 | Syu et al. |
| 8,407,449 | B1 | 3/2013 | Colon et al. |
| 8,423,722 | B1 | 4/2013 | Deforest et al. |
| 8,433,858 | B1 | 4/2013 | Diggs et al. |
| 8,443,167 | B1 | 5/2013 | Fallone et al. |
| 8,447,920 | B1 | 5/2013 | Syu |
| 8,458,435 | B1 | 6/2013 | Rainey, III et al. |
| 8,478,930 | B1 | 7/2013 | Syu |
| 8,489,854 | B1 | 7/2013 | Colon et al. |
| 8,503,237 | B1 | 8/2013 | Horn |
| 8,521,972 | B1 | 8/2013 | Boyle et al. |
| 8,549,236 | B2 | 10/2013 | Diggs et al. |
| 8,583,835 | B1 | 11/2013 | Kan |
| 8,601,311 | B2 | 12/2013 | Horn |
| 8,601,313 | B1 | 12/2013 | Horn |
| 8,612,669 | B1 | 12/2013 | Syu et al. |
| 8,612,804 | B1 | 12/2013 | Kang et al. |
| 8,615,681 | B2 | 12/2013 | Horn |
| 8,638,602 | B1 | 1/2014 | Horn |
| 8,639,872 | B1 | 1/2014 | Boyle et al. |
| 8,683,113 | B2 | 3/2014 | Abasto et al. |
| 8,700,834 | B2 | 4/2014 | Horn et al. |
| 8,700,950 | B1 | 4/2014 | Syu |
| 8,700,951 | B1 | 4/2014 | Call et al. |
| 8,706,985 | B1 | 4/2014 | Boyle et al. |
| 8,707,104 | B1 | 4/2014 | Jean |
| 8,745,277 | B2 | 6/2014 | Kan |
| 2002/0184436 | A1 | 12/2002 | Kim et al. |
| 2003/0065899 | A1 | 4/2003 | Gorobets |
| 2004/0210706 | A1* | 10/2004 | In et al. ............. 711/103 |
| 2005/0166028 | A1 | 7/2005 | Chung et al. |
| 2008/0098195 | A1 | 4/2008 | Cheon et al. |
| 2009/0150599 | A1 | 6/2009 | Bennett |
| 2010/0106897 | A1 | 4/2010 | Yoshimura |
| 2010/0174849 | A1 | 7/2010 | Walston et al. |
| 2010/0180068 | A1 | 7/2010 | Matsumoto et al. |
| 2010/0250793 | A1 | 9/2010 | Syu |
| 2011/0099323 | A1 | 4/2011 | Syu |
| 2011/0161621 | A1* | 6/2011 | Sinclair et al. ............. 711/207 |
| 2011/0283049 | A1 | 11/2011 | Kang et al. |
| 2011/0307651 | A1* | 12/2011 | Wong ............. 711/103 |
| 2012/0144152 | A1* | 6/2012 | Jeddeloh ............. 711/206 |
| 2012/0198130 | A1* | 8/2012 | Noborikawa et al. ......... 711/103 |
| 2012/0260020 | A1 | 10/2012 | Suryabudi et al. |
| 2012/0278531 | A1 | 11/2012 | Horn |
| 2012/0284460 | A1 | 11/2012 | Guda |
| 2012/0324191 | A1 | 12/2012 | Strange et al. |
| 2013/0132638 | A1 | 5/2013 | Horn et al. |
| 2013/0145106 | A1 | 6/2013 | Kan |
| 2013/0166819 | A1 | 6/2013 | Yerushalmi et al. |
| 2013/0185508 | A1 | 7/2013 | Talagala et al. |
| 2013/0290793 | A1 | 10/2013 | Booth et al. |
| 2014/0059405 | A1 | 2/2014 | Syu et al. |
| 2014/0115427 | A1 | 4/2014 | Guangming Lu |
| 2014/0133220 | A1 | 5/2014 | Danilak et al. |
| 2014/0136753 | A1 | 5/2014 | Tomlin et al. |

* cited by examiner

SYSTEM DATA MANAGEMENT USING GARBAGE COLLECTION AND HYBRID SELF MAPPING

BACKGROUND

1. Technical Field

This disclosure relates to data storage systems, such as non-volatile data storage systems, for computer systems. More particularly, the disclosure relates to managing system data using garbage collection and hybrid self-mapping.

2. Description of the Related Art

Data storage systems can utilize various types of system data, such as logical to physical address mapping data, which associates logical addresses used by a host system for accessing stored data with corresponding physical locations in a data storage system where data is stored. Due to updates of data stored in the data storage system, certain stored data may become outdated, thereby causing entries in the mapping table corresponding to such outdated data to become invalid. In such circumstances, the data storage system can generate updated mapping table entries. However, various problems arise with maintenance of system data, such as increased write amplification associated with storing system data, increased reconstruction times, and the like. Accordingly, it is desirable to provide mechanisms that efficiently handle maintenance of system data.

BRIEF DESCRIPTION OF THE DRAWINGS

Systems and methods that embody the various features of the invention will now be described with reference to the following drawings, in which.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems can utilize various types of system data, including logical to physical address mapping data, superblock data, invalid page data, invalid counter data, wear level data, and so on. Logical to physical address mapping table can comprise information associating logical addresses used by a host system to store data in a data storage system and/or access stored data with physical locations in the data storage system where data is stored. Superblock table can comprise information concerning logical groupings of non-volatile memory blocks into superblocks. Superblocks can be utilized to achieve parallel or concurrent execution of multiple storage access operations. In one embodiment, each block in a superblock can be on one die of a group of non-volatile memory dies. Other configurations are possible in other embodiments. For example, a superblock can be comprised of blocks from various planes in a group of dies. In another embodiment, multiple blocks within a superblock may be on the same die/plane. Invalid page table can comprise information concerning locations of non-volatile memory pages that are defective or unreliable (e.g., those pages where data should not be stored). Invalid counter table can comprise information corresponding to the associations of invalid pages with particular superblocks. Wear level table can comprise erase counts for non-volatile memory locations (e.g., partial pages, pages, blocks, groups of blocks, etc.).

Some embodiments of the present invention generate and update system data quickly and efficiently while reducing write amplification associated with managing system data. Advantageously, reconstruction time of system data (e.g., during initialization) is also reduced. In addition, segmenting of system data (e.g., storing and loading segments of system data) is allowed, and efficiency of loading segments of system data is increased.

In some embodiments of the present invention, system data can be maintained in a volatile memory of a data storage system, and is periodically stored or flushed to a non-volatile memory for persistent storage. First and second sets of system data pages can be flushed to first and second regions (e.g., superblocks) in a non-volatile memory array. As a result of performing storage access operations in the data storage system, certain entries of the first and second sets of system data pages may become invalid. In response to determining that a number of remaining valid entries in the first set of system data pages falls below a selected threshold, valid entries pages of the first set are copied to a third region of the non-volatile memory array. The first region can be marked as free for future use.

In some embodiments of the present invention, the first region comprises the smallest number of valid system data pages in any region of the non-volatile memory where system data pages are stored. This region is selected for freeing (e.g., by performing garbage collection). Accordingly, write amplification associated with flushing system data is reduced because the region with the smallest amount of valid system data can be selected for garbage collection, which can comprise copying valid system data to the third region.

In some embodiments of the present invention, a mapping information (e.g., mapping page or pages) indicating non-volatile memory array locations in which the system data pages are stored is generated. Generating and storing in the non-volatile memory such mapping page reduces time associated with reconstruction of system data (which can reduce initialization or start up time of the data storage system). This is because the mapping page can be used to locate system data pages based on the indications of locations where system data pages are stored. Thereby, a copy of the located system data pages can be loaded from non-volatile memory to the volatile memory.

Some embodiments of the present invention do not utilize logs for tracking changes to system data (e.g., changes that are associated with updates of data stored in the data storage system). Instead, updated system data information is generated and flushed to the non-volatile memory.

System Overview

Figure 1:
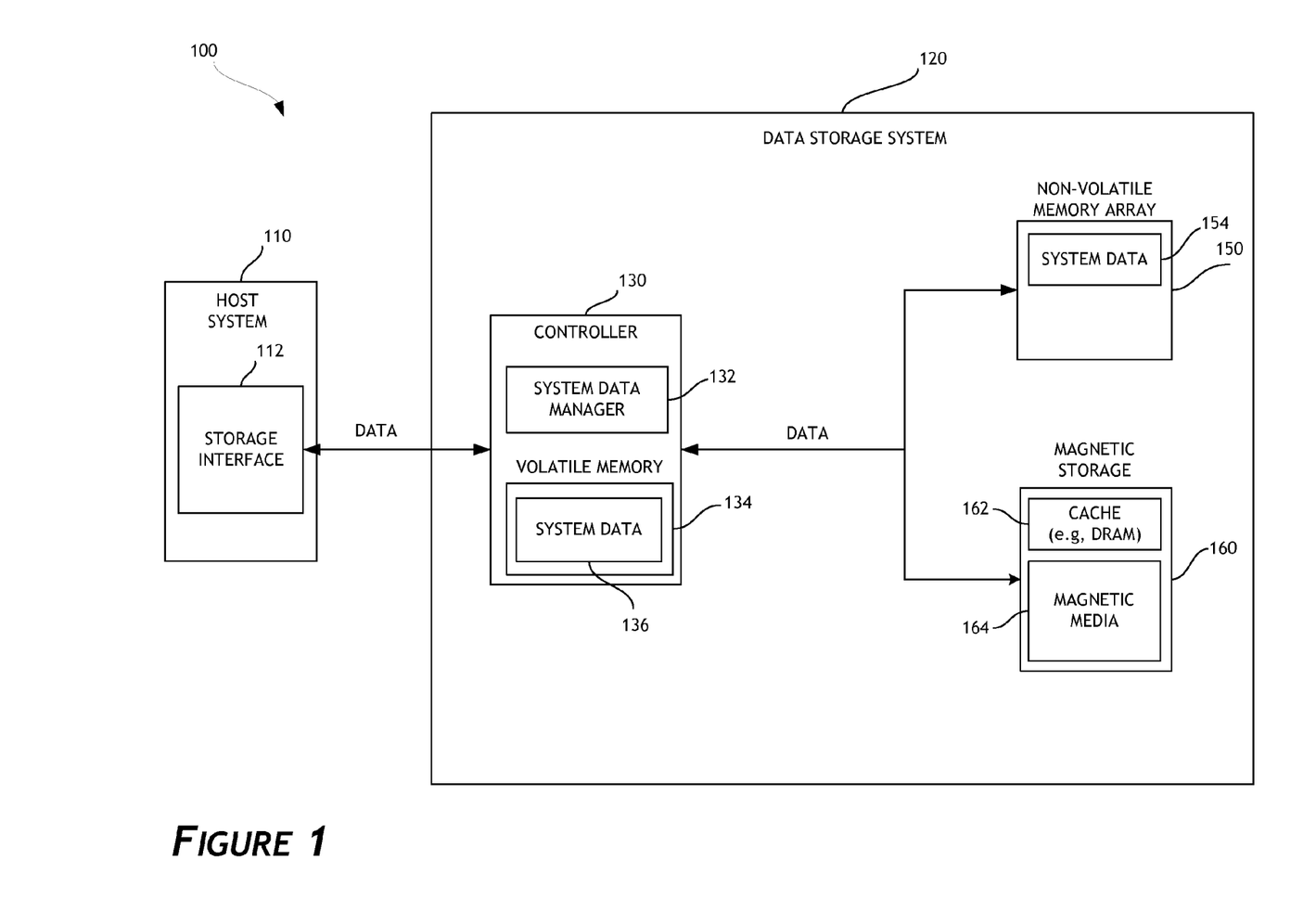
FIG. 1 illustrates a combination of a host system and a data storage system that implements garbage collection and hybrid self-mapping according to an embodiment of the invention.

FIG. 1 illustrates a combination 100 of a host system and a data storage system that implements garbage collection and hybrid self-mapping according to an embodiment of the invention. As is shown, the data storage system 120 (e.g., a hard disk drive, hybrid disk drive, solid-state drive, etc.) includes a controller 130 and a non-volatile memory array 150, which can store host data, system data 154, and other types of data. The non-volatile memory array 150 comprises non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In some embodiments, non-volatile memory 150 can be partitioned into dies, planes, channels, blocks, pages, and so on. In certain embodiments, a non-volatile memory page (e.g., NAND page) can refer to a smallest grouping of memory cells (or smallest granularity) that can be programmed or written in a single operation or as a unit (e.g., atomically). In some embodiments, the data storage system 120 can also comprise other types of storage, such as one or more magnetic storage modules 160, which can comprise volatile cache (e.g., DRAM) 162 and non-volatile magnetic media 164.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., LBA) used to access the data storage system 120. The controller 130 can execute the received commands in the non-volatile memory array 150 and/or other storage modules, such as magnetic storage 160.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where host data can be stored. Internally, the controller 130 can map logical addresses to various physical locations or addresses in the non-volatile memory array 150 and/or other storage modules. Such mapping can be performed using a logical to physical address mapping table.

The controller 130 includes a system data manager module 132 for generating, maintaining, updating, storing, etc. various types of system data. Such system data can include one or more of the following: logical to physical address mapping data, superblock data, invalid page data, invalid counter data, wear level data, and so on. Although logical to physical address mapping table system data example is used throughout this disclosure, approaches disclosed herein are applicable to other types of system data organized as tables or using other suitable data structures. In some embodiments, approaches disclosed herein can be particularly applicable to types of system data whose changes tend to be localized because of host activity (e.g., operating system activity). Examples of such types of system data include logical to physical mapping data, invalid page data, invalid counter data, wear level data, and the like.

The controller 130 also includes volatile memory 134 where various types of data can be stored, such as system data 136. It may be advantageous to store system data in the volatile memory 134 for faster access (e.g., particularly data that is frequently used by the controller 130 and/or the data storage system 120). In some embodiments, volatile memory 134 can be located outside the controller 130.

Garbage Collection and Hybrid Self-Mapping

Figure 2A:
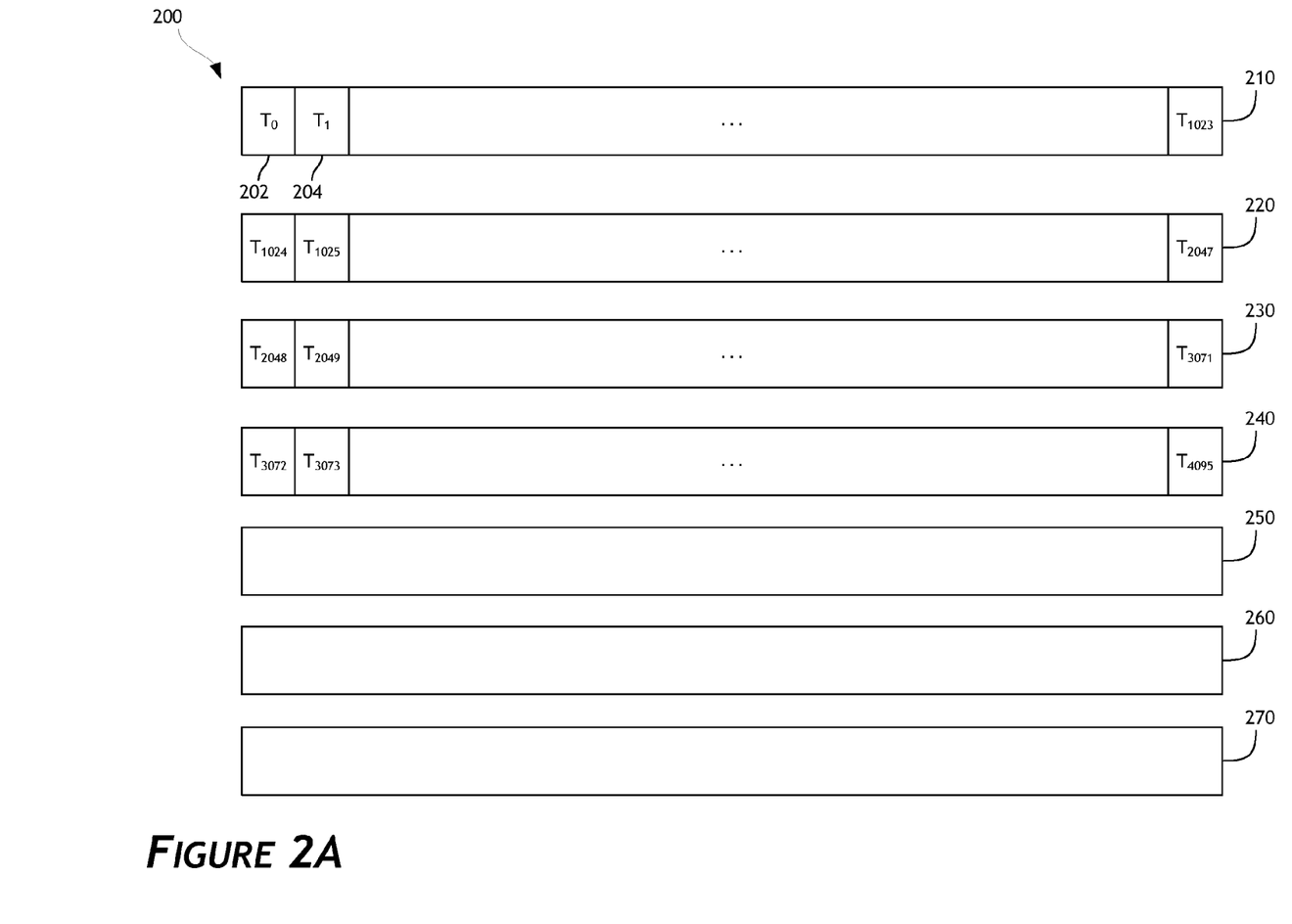
FIGS. 2A-2D illustrate managing system data using garbage collection and hybrid self-mapping according to an embodiment of the invention.

FIGS. 2A-2D illustrate managing system data using garbage collection and hybrid self-mapping according to an embodiment of the invention. The figures illustrate managing logical to physical address mapping table at different times during the operation of the data storage system 120. Managing of system data can be performed by the controller 130 and/or system data manager 132. With reference to FIG. 2A, at some initial time $t_0$, logical to physical address mapping table 200 can be stored in regions 210, 220, 230, and 240 of the non-volatile memory array 150. In one embodiment, regions 210, 220, 230, and 240 can be superblocks. Regions 250, 260, and 270 can represent currently unused superblocks reserved or allocated for storing the mapping table (e.g., over-provisioning for the mapping table). As is depicted, mapping table 200 is partitioned and stored in table pages $T_o$ (202), $T_1$ (204), and so on. Table pages can comprise mappings or associations between logical and physical addresses in the data storage system 120, such as associations between logical chunk numbers (LCNs) and physical chunk number (PCNs), associations between logical block addresses (LBAs) and PCNs, and the like. In some embodiments, a "table page" refers to a quantity of mapping table data that fits into a page of non-volatile memory. FIG. 2A can represent the initial state of the mapping table 200 at time $t_0$.

Figure 2B:
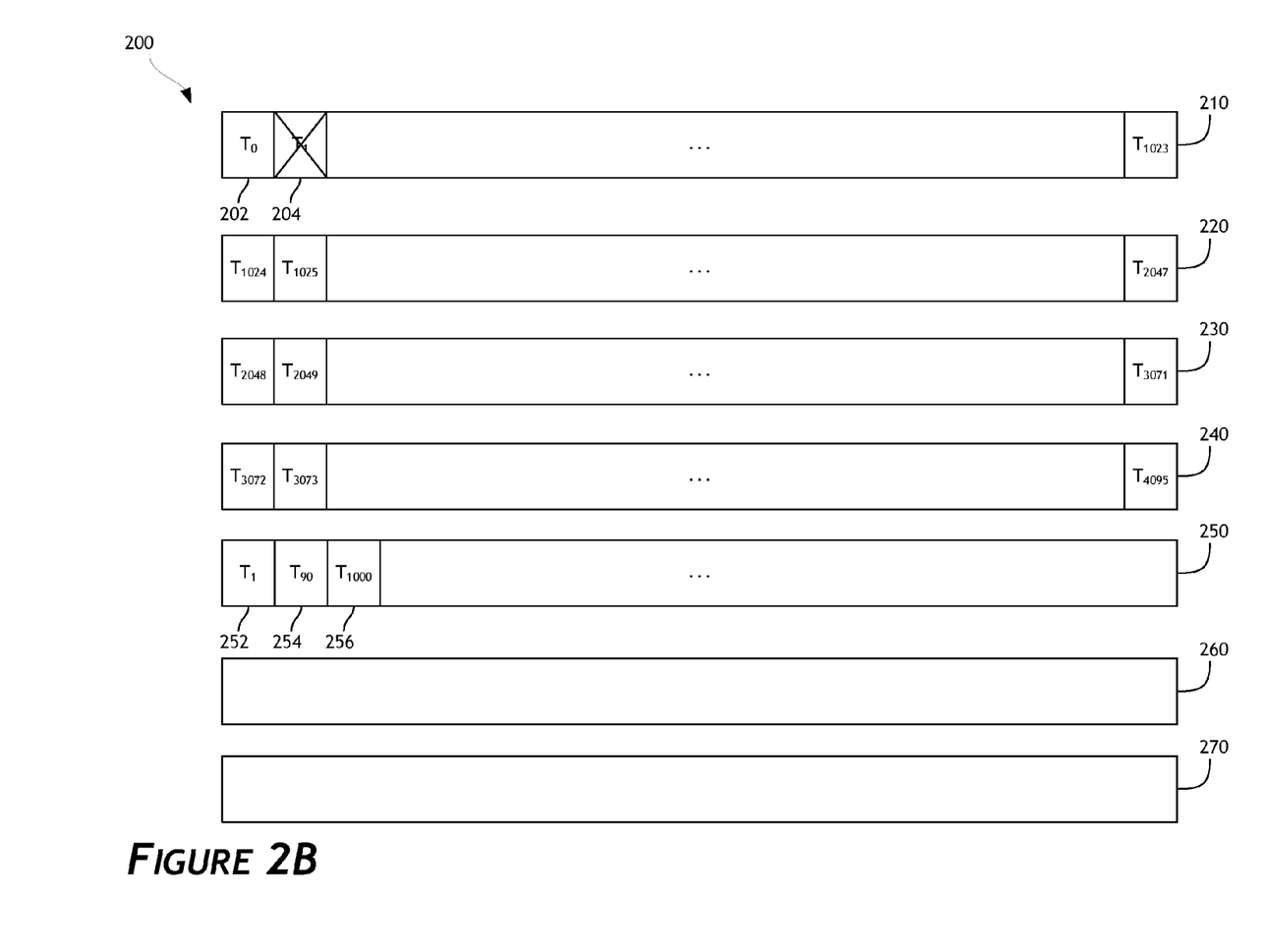

FIG. 2B can represent the state of the mapping table 200 at time $t_1$ that is later than time $t_0$. As a result of executing storage access operations communicated by the host system 110 or executing data access operations internally generated by the data storage system 120, data stored in the storage system may have been updated. For example, the host system 110 could have communicated a more recent copy or copies of data for storing in the data storage system 120. In one embodiment, because the host system 110 uses logical addresses for accessing (e.g., updating) data stored in the data storage system 120, the details of physical storage of data in the data storage system 120 (e.g., in the non-volatile memory array 150) are abstracted from the host system 110. The data storage system 120 can store a more recent copy or copies of data in different physical memory locations than the locations where data is already stored. That is, the data storage system 120 memory (e.g., non-volatile memory array 150) may be such that in-place updates of data that is already stored are not permitted or desirable due to the physical configuration of the memory. In such cases, data storage system 120 may invalidate the existing association between the logical address or addresses corresponding to the physical location or locations where outdated copies of data are stored and create a new association between the logical address or addresses and another physical location or locations where a more recent (or most recent) copies of data are written.

With reference to FIG. 2B, at least some logical to physical address associations stored in table page $T_1$ (204) may have become invalid. Accordingly, the data storage system 120 (e.g., via the controller 130 and/or system data manager 132) can generate and store in a page of the region 250 a table page $T_1$ (252) comprising new associations between logical addresses and physical locations where updated copies of data are stored. Table page $T_1$ (204) can be designated or marked as invalid because it comprises outdated associations. Table page $T_1$ (252) can serve as a replacement page for table page 204. Further, as is illustrated, replacement table pages 254 and 256 for table pages $T_{90}$ and $T_{1000}$ respectively from the region 210 can be generated and stored in pages of the region 250. Table pages $T_{90}$ and $T_{1000}$ can likewise be designated or marked as invalid.

Figure 2C:
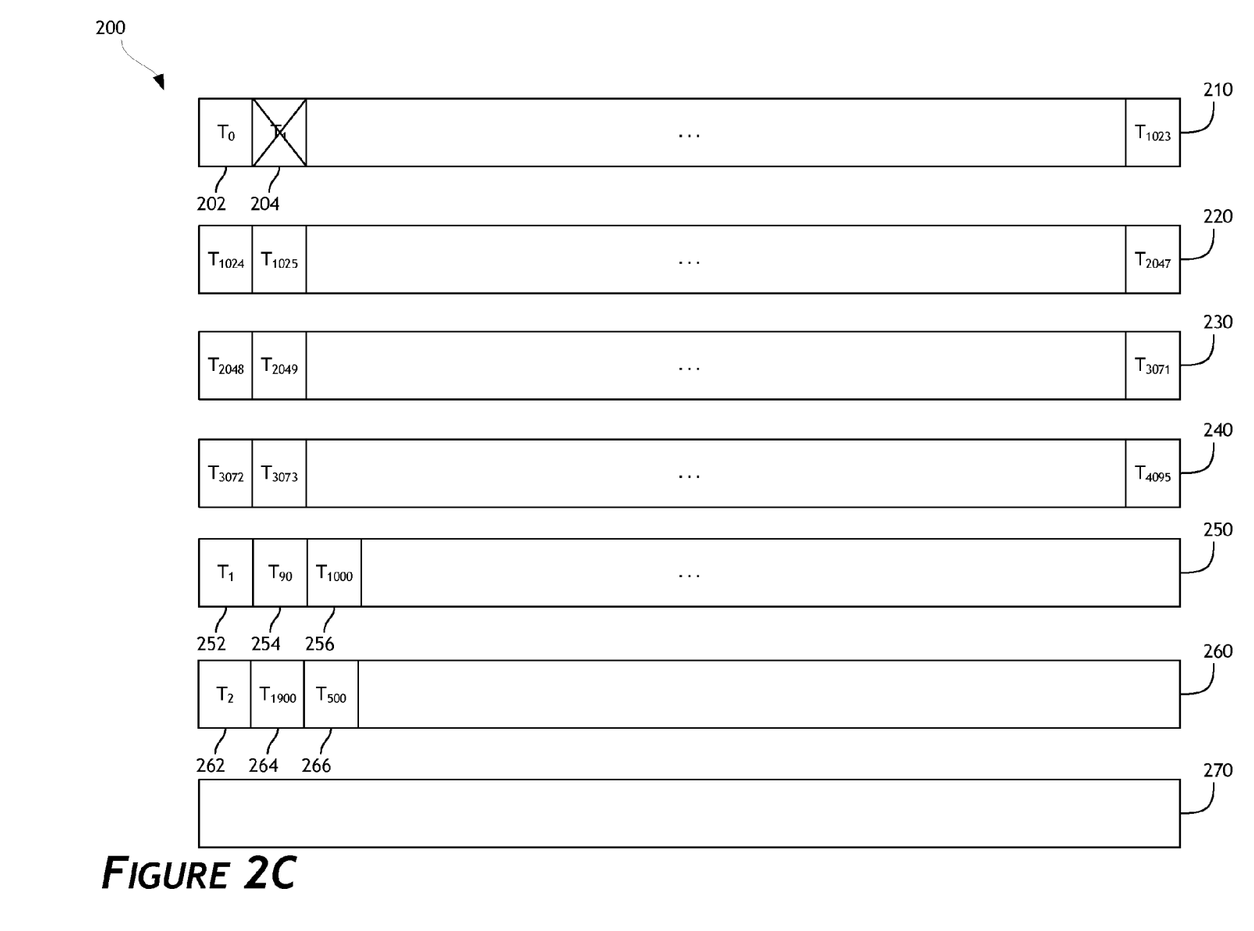

FIG. 2C can represent the state of the mapping table 200 at time $t_2$ that is later than time $t_1$. As is illustrated, replacement table pages 262 and 266 for table pages $T_2$ and $T_{500}$ respectively from the region 210 can be generated and stored in pages of the region 260. Further, replacement table page 264 for table page $T_{1900}$ respectively from the region 220 can be generated and stored in a page of the region 260. In one embodiment, table pages are stored in the region 260 because region 250 may already be full. Region 270 can remain free.

Figure 2D:
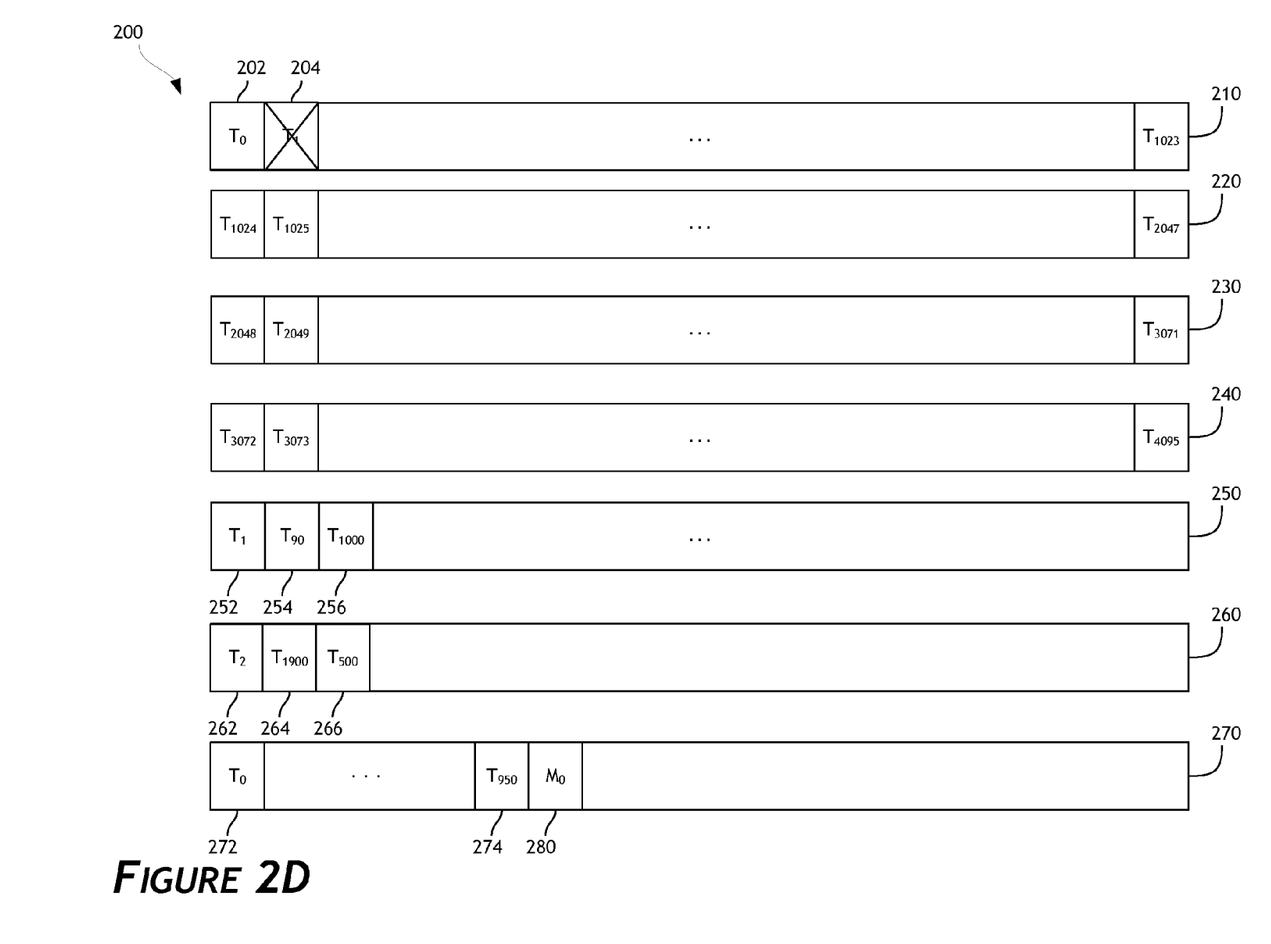

FIG. 2D can represent the state of the mapping table 200 at time $t_3$ that is later than time $t_2$. At this time, the controller 130 and/or system data manager 132 may determine that a region of memory should be freed for storing the mapping table data. In one embodiment, the controller 130 and/or system data manager 132 can select a region of memory for garbage collection. In one embodiment, a region with the least amount of valid mapping table data (e.g., most number of table pages that are designated as invalid) can be freed. In another embodiment, a region with amount of valid data that falls below a valid data threshold can be freed. In one embodiment, such region can be freed by moving only valid table page data to another region (e.g., free region or region designated as free). Because invalid table page data is not copied or moved, a reduction in the amount of data that is copied is achieved, which results in decreased write amplification associated with managing system data. In addition, because of the delay in committing changes to mapping table data to the non-volatile memory array 150, the amount of mapping table data that needs to be copied is reduced. In another embodiment, a region can be freed by copying some or all invalid table data in addition to copying valid table data.

With reference to FIG. 2D, the controller 130 and/or system data manager 132 may determine that region 210 (e.g., superblock) has the least amount of valid mapping table data. For example, it may be determined that mapping table data stored in region 210 is 25% valid, while mapping table data stored in region 220 is 60% valid, and mapping table data stored in region 230 is 90% valid. In one embodiment, region 210 can be freed by copying valid mapping table data 272 through 274 stored in the region 210 to a free region (e.g., region 270). In one embodiment, if mapping table data in region 210 is 25% valid, write amplification associated with freeing the region 210 is 1.25 because only 25% of region 210 needs to be copied. After valid data is copied, region 210 can be designated as a free region (and reserved for future storage of mapping table data).

In some embodiments, write amplification in the best case is 1.0 (e.g., region with no valid mapping table entries is garbage collected). In certain embodiments, write amplification in the worst case can be determined according to the following equation or some variation thereof:

$$\text{maximum write amplification} = 1/\text{over-provisioning} \quad (1)$$

where over-provisioning is the amount of extra regions allocated to or reserved for storing the mapping table. For example, the amount of over-provisioning for the mapping table 200 is 50% (or 0.5) because, as is show in FIG. 2A, three extra regions 250, 260, and 270 are allocated for storing the mapping table 200. In such case, worst case write amplification can be 2. Accordingly, write amplification associated with managing (e.g., updating) system data is reduced.

With reference to FIG. 2D, the controller 130 and/or system data manager 132 can generate a mapping information or page $M_0$ (280) in one embodiment. Mapping page 280 can include information indicating non-volatile memory locations where mapping table data (e.g., valid mapping table pages) is stored. In one embodiment, the mapping page 280 can comprise the following mapping:

{$T_0$=region 270, page 0}
{$T_1$=region 250, page 0}
{$T_2$=region 260, page 0}
. . .
{$T_{90}$=region 250, page 1}
. . .

In one embodiment, the mapping page 280 can include a header that provides information regarding aggregate number of valid mapping table pages within each region (e.g., 3 KB/4 KB or 75%). The header or other identifying information (such as metadata) may be used to identify the mapping page among pages of non-volatile memory array 150.

The mapping page 280 can be used to increase the start-up or power-up time of the data storage system 120. During reconstruction of the mapping table (e.g., loading of the mapping table from the non-volatile memory 150 to the volatile memory 134), the mapping page provides a list of pointers to locations in the non-volatile memory where mapping table pages are stored. Using mapping page information allows for faster full or partial (e.g., segmented) reconstruction of the mapping table.

In one embodiment, the mapping page 280 can be periodically generated and stored in (or flushed to) the non-volatile memory array 150. For example, the mapping page can be generated and stored after N number of updates to the mapping table have been performed, where N is an integer number (e.g., 2, 4, 8, 10, 16, 20, 32, 64, etc.). That is, a new mapping page can be generated and stored after N new mapping table pages have been generated and stored. As another example, a new mapping page can be generated and stored periodically, such as after every N number of new updates to the mapping table have been performed.

Figure 3:
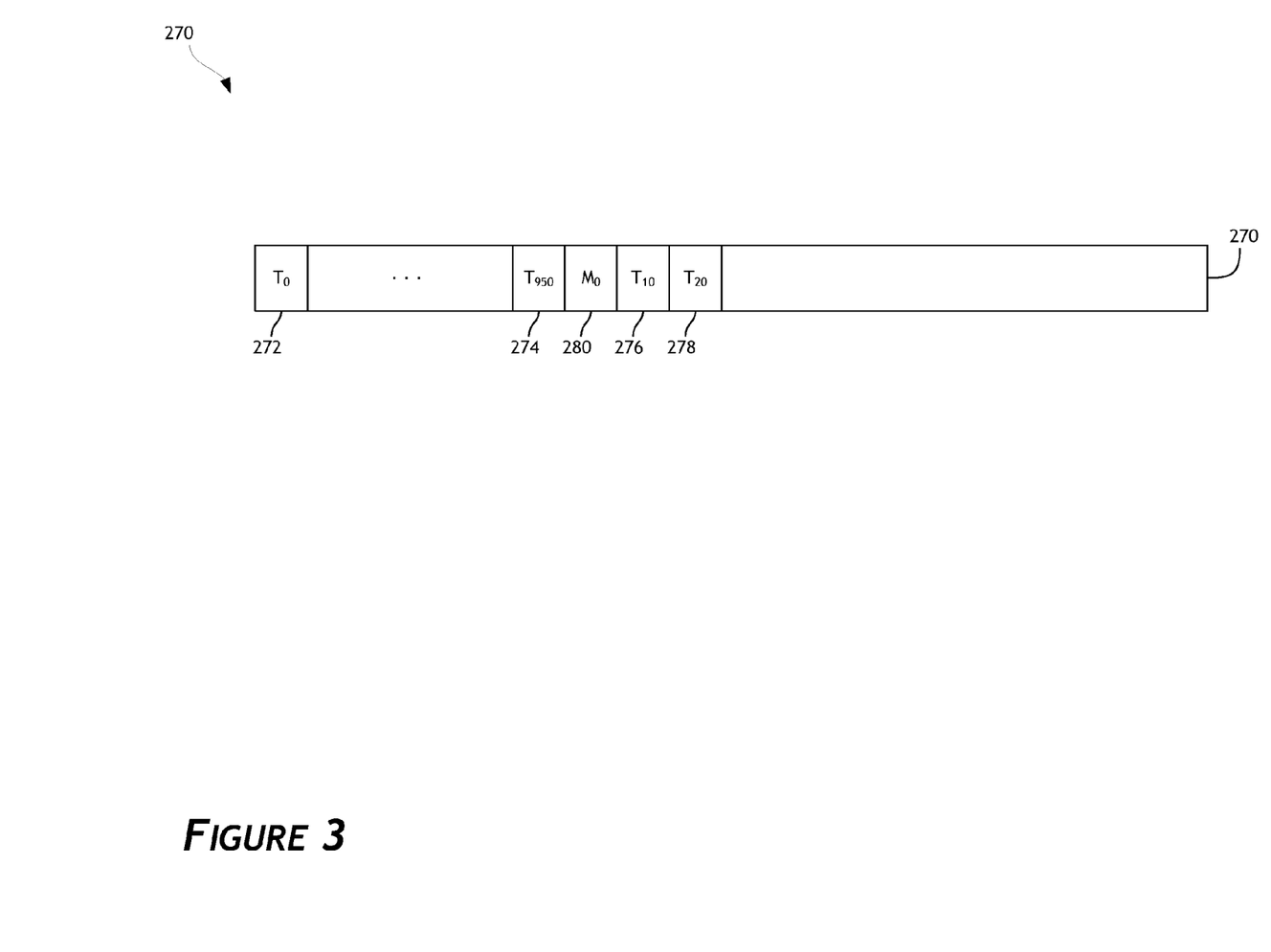
FIG. 3 illustrates managing system data in connection with handling an interruption or loss of power.

In an embodiment, the mapping page 280 can be generated and stored in (or flushed to) the non-volatile memory array 150 when the data storage system 120 experiences a power interruption, power loss, system shutdown, system reset, etc. In addition, any generated updated mapping table pages can also be stored in (or flushed to) the non-volatile memory array 150. Such flushing keeps the mapping table power safe. FIG. 3 illustrates region 270 of the mapping table 200 in connection with handling power interruption, power loss, system shutdown, system reset, etc. As is shown, the mapping page 280 can be flushed to the region 270. In addition, updated mapping table pages 276 and 278 can be flushed to the region 270. In one embodiment, the mapping page 280 may not reflect information indicating locations of mapping table pages 276 and 278 in the non-volatile memory 150. However, the data storage system 120 can scan non-volatile memory pages past or beyond the mapping page for updated (e.g., valid) mapping table pages. In such cases, the number of non-volatile memory pages to scan can be bounded by a mapping page flushing threshold (e.g., N, which is an integer number, such as 4, 8, 10, 16, 20, 32, 64, etc.). Accordingly, reduction in reconstruction time of the mapping table (e.g., partial reconstruction or full reconstruction) can be achieved. In addition, mapping table pages can comprise an identifier (e.g., header) or identifying information (e.g., metadata) that identifies a page as a mapping table page.

In one embodiment, multiple mapping pages can be generated and flushed to the non-volatile memory array 150. For example, a next mapping page (e.g., mapping page generated after a current mapping page has already been generated) can reflect changes in locations of mapping table pages due to copying valid mapping pages as a result of performing garbage collection, changes in locations of mapping table pages due to updates of stored data and due to marking certain table pages as invalid, and the like. In another embodiment, the already generated mapping page can be updated to reflect such changes.

Figure 4:
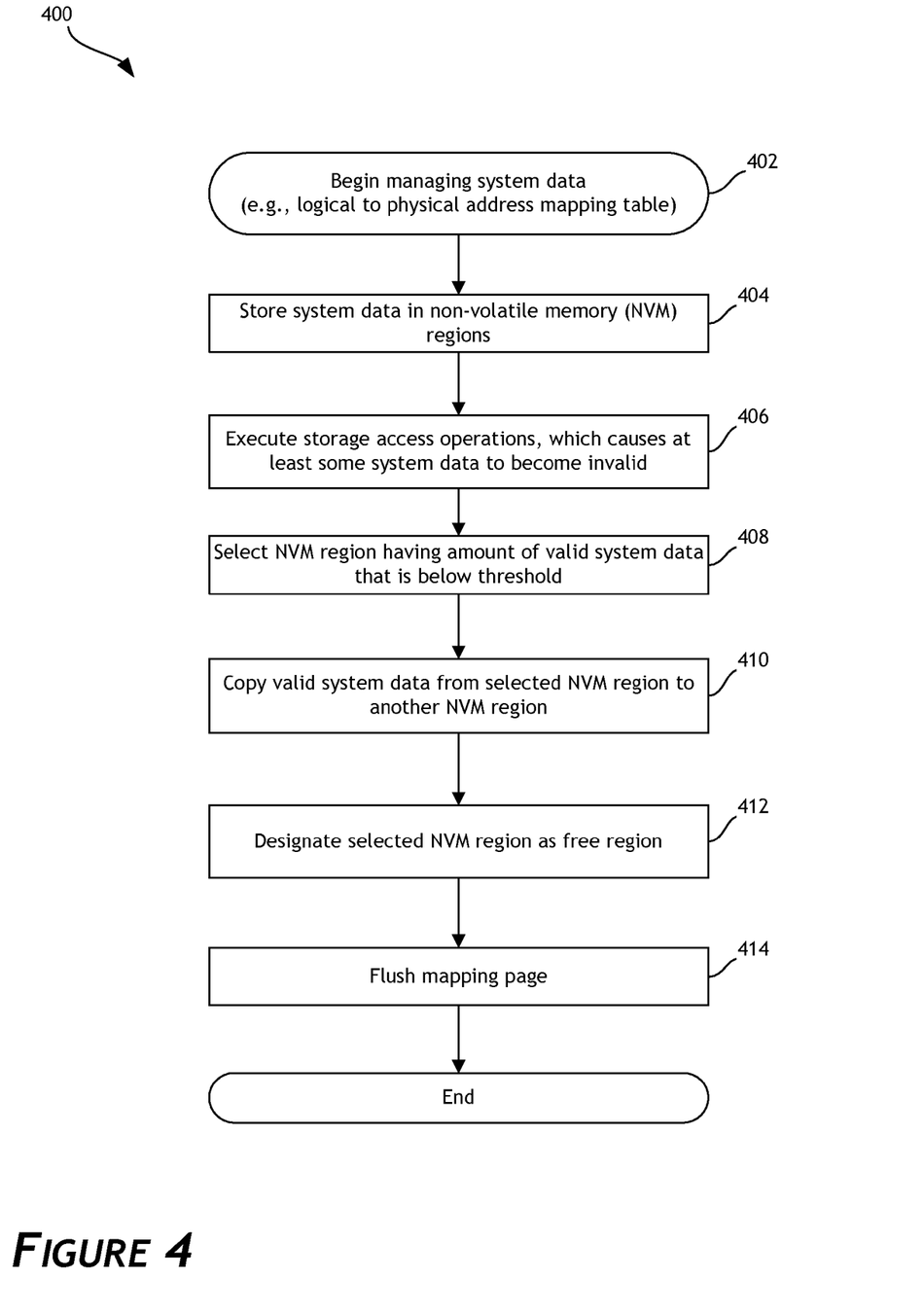
FIG. 4 is a flow diagram illustrating managing system data using garbage collection and hybrid self-mapping according to an embodiment of the invention.

FIG. 4 is a flow diagram illustrating a process 400 for managing system data using garbage collection and hybrid self-mapping according to an embodiment of the invention. The process 400 can be executed by the controller 130 and/or system data manager 132. In block 402, the process 400 begins managing system data, such as a logical to physical address mapping table. The mapping table can have table data (e.g., arranged or divided into table pages which fit into non-volatile memory array pages) that associates logical addressees used by the host system with physical locations in the data storage system 120 (e.g., in the non-volatile memory array 150). In block 404, the process 400 stores mapping table pages in regions (e.g., superblocks) of the non-volatile memory array 150. In block 406, the process 400 executes storage access operations (e.g., received from the host system 110 or internally generated by the data storage system 120). This can cause at least some data stored in the storage system 120 to become outdated or invalid, thereby invalidating certain mapping table data (e.g., mapping table pages that reflect associations between logical addresses and physical locations that store data that is outdated). In addition, the process 400 can generate and store in the non-volatile memory array 150 new mapping table data that reflects associations between logical addresses and physical locations that store the updated (or latest) data. In one embodiment, new mapping table data (e.g., mapping table pages) serve as replacement mapping table data for outdated mapping table data.

In block 408, the 400 process may determine that a non-volatile memory 150 region allocated for mapping table data needs to be freed. As described above, the process 400 can select for garbage collection a region having an amount of valid mapping table data (e.g., valid mapping table pages) that is below a valid data threshold. For example, a region having the least amount of valid data can be selected. In block 410, the process can perform garbage collection of the selected region. In one embodiment, the process can copy valid mapping table data (e.g., valid mapping table pages) from the selected region to another non-volatile memory region (e.g., spare or free region). In block 412 the process 412 can designate or mark the selected region (from which valid mapping table data was copied) as a free region so that the region can be used in the future for storing mapping table data.

In block 414, the process 400 can generate a mapping page indicating locations of valid mapping table pages in the non-volatile memory array 150. For example, as described above, the mapping page can be generated and stored after the process 400 generates and stores (e.g., flushes to the non-volatile memory array) a certain amount of mapping table data that includes new (or replacement) associations between logical addresses and physical locations. The mapping page can be generated when the number reaches and/or exceeds a threshold, as is described above. The process 400 can terminate after the mapping page has been flushed.

Figure 5:
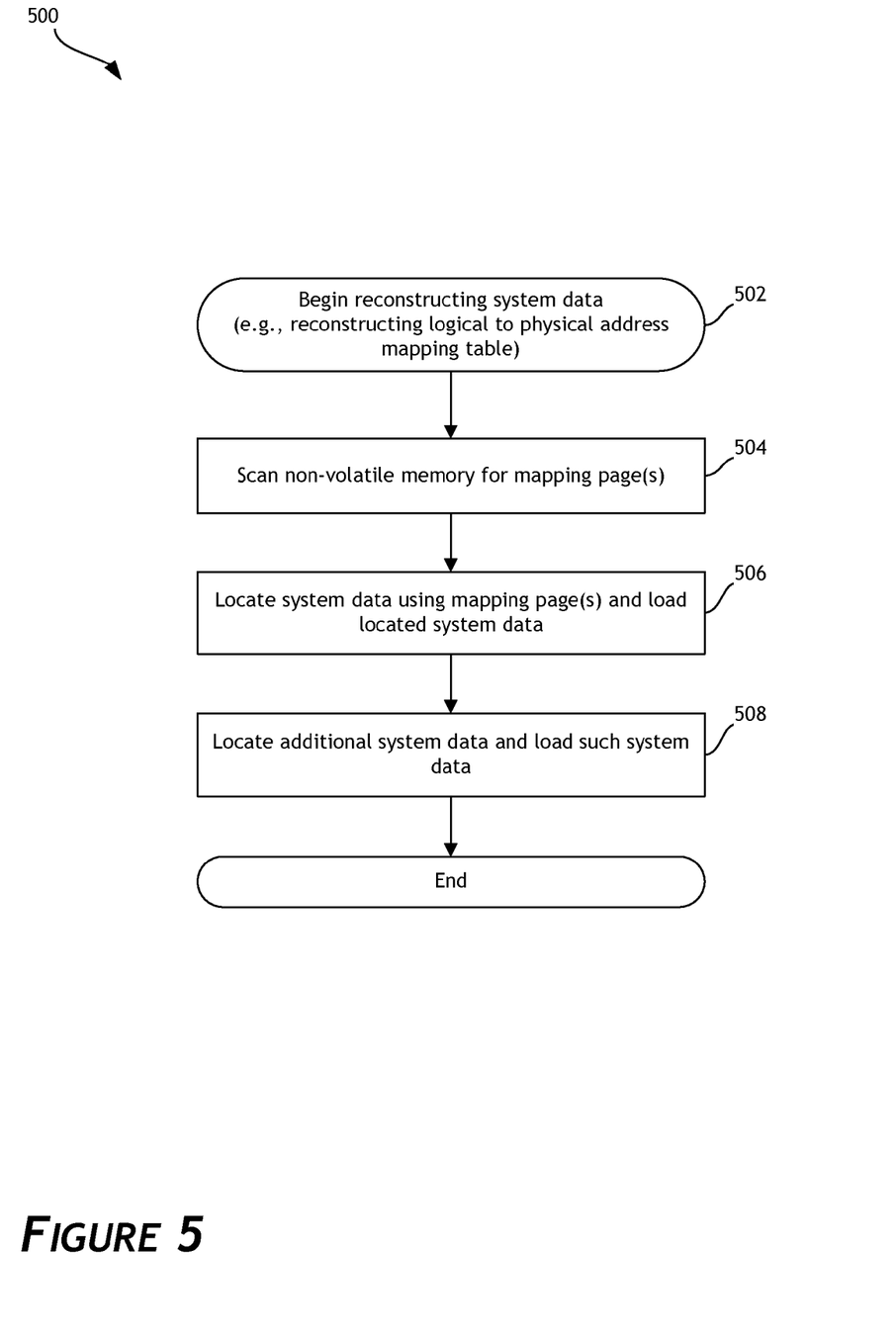
FIG. 5 is a flow diagram illustrating reconstruction of system data using garbage collection and hybrid self-mapping according to an embodiment of the invention.

FIG. 5 is a flow diagram 500 illustrating reconstruction or loading of system data using garbage collection and hybrid self-mapping according to an embodiment of the invention.

The process 500 can be executed by the controller 130 and/or system data manager 132. In block 502, the process 500 begins reconstructing system data, such as logical to physical address mapping table. In one embodiment, the process 500 can reconstruct the mapping table during initialization or following a restart of the data storage system 120 (e.g., such as after a power loss, power interruption, shutdown, reset, etc.). In an embodiment, the process can perform full reconstruction. In other words, the process can reconstruct the entire mapping table. In another embodiment, the process can reconstruct a portion or segment of the mapping table (e.g., perform segmented reconstruction).

In block 504, the process 500 locates the mapping page(s). The process 500 can locate the mapping page(s) by scanning non-volatile memory regions. As is described above, the mapping page(s) can have an identifying header or other identifying information (such as metadata). In one embodiment (as is described above), the mapping page(s) can be periodically flushed to the non-volatile memory 150. For example, the process 500 can scan non-volatile memory regions for the mapping page(s) by scanning backward in a region (e.g., superblock) starting from the last updated table page flushed to the non-volatile memory array 150. The process 500 can scan the non-volatile memory backward until it locates the mapping page(s). In another embodiment, the process 500 can store physical location(s) of the mapping page(s) (e.g., pointer(s) to the physical location(s)) in a well-known memory location (e.g., root table, parent table, etc.). This location information can be used to locate the mapping page(s) in the non-volatile memory array 150.

In block 506, the process 500 can use information in the mapping page(s) to locate mapping table data stored in the non-volatile memory array 150 (e.g., each mapping table page when full reconstruction is performed or a selected set of mapping table pages when segmented reconstruction is performed). The process 500 can load located mapping table data into the volatile memory 134. In block 508, the process 500 can locate additional mapping table data stored past or beyond the mapping page(s). As is described above, mapping table pages can include identifying information (e.g., metadata). If such additional mapping table data is found, the process can load such data into the volatile memory 134. The process can terminate when it loads the entire mapping table or a desired segment of the mapping table (which may be referred to as loading).

CONCLUSION

To increase the efficiency of managing and storing system data and to reduce reconstruction time, a data storage system can utilize garbage collection and hybrid self-mapping. Write amplification associated with managing and storing system data can be reduced at least in part because of the delay in committing system data changes or updates to non-volatile memory, such as the delay in copying updated system data from one non-volatile memory region to another non-volatile memory region. In addition, write amplification can be reduced because only valid system data can be copied when garbage collection is performed. Reconstruction time can be reduced because mapping associating system data with physical locations in non-volatile storage where system data is stored can be generated. Logs that indicate changes to system data may not be necessary.

Other Variations

Those skilled in the art will appreciate that additional system components can be utilized, and disclosed system components can be combined or omitted. In some embodiments system data can be generated without being stored in the non-volatile memory. In addition, while in some embodiments a table page refers to a quantity of mapping table data that fits into a page of non-volatile memory, other storage arrangements can be utilized. Although logical to physical address mapping table system data example is used throughout this disclosure, approaches disclosed herein are applicable to other types of system data organized as tables or using other suitable data structures. System data can be stored in other non-volatile memory modules, such as magnetic storage. For example, in one embodiment where the data storage system is a shingled magnetic device, which may use address indirection that require maintenance of mapping table data, the system data may be saved in the magnetic storage 160 in the manners described herein. Further, other methods of scanning for mapping information or page(s) can be used. Logs indicating changes to system data additionally can be used in some embodiments. The actual steps taken in the disclosed processes, such as the processes illustrated in FIGS. 4 and 5, may differ from those shown in the figures. Depending on the embodiment, certain of the steps described above may be removed, others may be added. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. In a data storage system comprising a non-volatile memory array and a controller, a method of managing a mapping table comprising a plurality of table pages associating logical addresses with physical locations in the non-volatile memory array where data is stored, the method comprising:
    storing a first set of table pages in a first region of the non-volatile memory array;
    storing a second set of table pages in a second region of the non-volatile memory array, wherein the first and second regions are configured to achieve concurrent execution of storage access operations;
    executing a plurality of storage access operations;
    determining whether certain pages of the first and second sets of table pages have become invalid as a result of executing the storage access operations;
    determining the number of remaining valid table pages existing at least in the first set of table pages;
    generating a mapping page that includes information indicating the determined number of remaining valid table pages in each of the first and second regions, wherein the determined number of remaining valid table pages is included in a header of the mapping page; and
    if the number of the remaining valid table pages satisfies a threshold:
    copying the valid table pages of the first set to a third region of the non-volatile memory array; and
    freeing the first region,
    wherein, by delaying the copying of mapping table pages until the number of the remaining valid tables pages satisfies the threshold, the number of table pages copied is reduced, and
    wherein the method is performed under the control of the controller.

2. The method of claim 1, wherein the non-volatile memory array further comprises a plurality of additional regions, and wherein the method further comprises:
    determining a region that includes the smallest number of valid table pages of any region of the non-volatile memory array where table pages are stored;
    copying the valid table pages of the determined region to a third region of the non-volatile memory array; and
    freeing the determined region.

3. The method of claim 1, wherein executing the storage access operations comprises executing write data operations, each write data operation comprising a logical address in the data storage system and a data unit.

4. The method of claim 3, further comprising at least partially in response to executing each of the write data operations:
    invalidating a first table page indicating an existing association between the logical address corresponding to a write data operation and a physical location in the non-volatile memory array; and
    storing, in a second table page, a new association between the logical address and another physical location in the non-volatile memory array where the data unit corresponding to the write data operation is written, wherein the second table page is a replacement for the first table page.

5. The method of claim 1, wherein the mapping page additionally includes information indicating non-volatile memory array locations in which at least some of the plurality of table pages are stored, and wherein the mapping page reduces a time needed for reconstruction of at least a part of the mapping table.

6. The method of claim 5, further comprising storing the mapping page in the non-volatile memory array if the number of the remaining valid table pages satisfies the threshold.

7. The method of claim 5, further comprising generating an updated mapping page that reflects one or more of: changes to the locations where table pages are stored due to the copying of the table pages to other non-volatile memory array regions and changes to the locations where table pages are stored due to the table pages becoming invalid as a result of executing the storage access operations.

8. The method of claim 5, further comprising reconstructing the mapping table by:
   using the mapping page, locating in the non-volatile memory array a table page; and
   loading the located table page from the non-volatile memory array to a volatile memory.

9. The method of claim 1, wherein logs configured to track changes to the table pages are not generated.

10. The method of claim 1, wherein the first region comprises a first superblock and the second region comprises a second superblock.

11. A data storage system comprising:
   a non-volatile memory array configured to store data and a mapping table comprising a plurality of table pages associating logical addresses with physical locations in the non-volatile memory array where data is stored; and
   a controller configured to:
   store a first set of table pages in a first region of the non-volatile memory array;
   store a second set of table pages in a second region of the non-volatile memory array, wherein the first and second regions are configured to achieve concurrent execution of storage access operations;
   execute a plurality of storage access operations;
   determine whether certain pages of the first and second sets of table pages have become invalid as a result of executing the storage access operations;
   determine the number of remaining valid table pages existing at least in the first set of table pages;
   generate a mapping page that includes information indicating the determined number of remaining valid table pages in each of the first and second regions, wherein the determined number of remaining valid table pages is included in a header of the mapping page; and
   if the number of the remaining valid table pages satisfies a threshold:
      copy the valid table pages of the first set to a third region of the non-volatile memory array; and
      free the first region.

12. The data storage system of claim 11, wherein the non-volatile memory array further comprises a plurality of additional regions, and wherein the controller is further configured to:
   determine a region that includes the smallest number of valid table pages of any region of the non-volatile memory array where table pages are stored;
   copy the valid table pages of the determined region to a third region of the non-volatile memory array; and
   free the determined region.

13. The data storage system of claim 11, wherein the storage access operations comprise write data operations, each write data operation comprising a logical address in the data storage system and a data unit.

14. The data storage system of claim 13, wherein, at least partially in response to executing each of the write data operations, the controller is further configured to:
   invalidate a first table page indicating an existing association between the logical address corresponding to a write data operation and a physical location in the non-volatile memory array; and
   store, in a second table page, a new association between the logical address and another physical location in the non-volatile memory array where the data unit corresponding to the write data operation is written, wherein the second table page is a replacement for the first table page.

15. The data storage system of claim 11, wherein the mapping page additionally includes information indicating non-volatile memory array locations in which at least some of the plurality of table pages are stored, wherein the mapping page reduces a time needed for reconstruction of at least a part of the mapping table.

16. The data storage system of claim 15, wherein the controller is further configured to store the mapping page in the non-volatile memory array if the number of the remaining valid table pages satisfies the threshold.

17. The data storage system of claim 15, wherein the controller is further configured to generate an updated mapping page that reflects one or more of: changes to the locations where table pages are stored due to the copying of the table pages to other non-volatile memory array regions and changes to the locations where table pages are stored due to the table pages becoming invalid as a result of executing the storage access operations.

18. The data storage system of claim 15, wherein the controller is further configured to:
   using the mapping page, locate in the non-volatile memory array a table page; and
   load the located table page from the non-volatile memory array to a volatile memory.

19. The data storage system of claim 11, wherein the controller is configured to not generate logs configured to track changes to the table pages.

20. The data storage system of claim 11, wherein the first region comprises a first superblock and the second region comprises a second superblock.

21. In a data storage system comprising a non-volatile memory array and a controller, a method of managing system data stored in a plurality of non-volatile memory array pages, the method comprising:
   storing a first set of system data pages of a first region of the non-volatile memory array;
   storing a second set of system data pages of a second region of the non-volatile memory array, wherein the first and second regions are configured to achieve concurrent execution of storage access operations;
   executing a plurality of storage access operations;
   determining whether at least some pages of the first and second sets of system data pages have become invalid as a result of executing the storage access operations;
   determining the number of remaining valid system data pages existing at least in the first set of system data pages;
   generating a mapping page that includes information indicating the determined number of remaining valid table pages in each of the first and second regions, wherein the determined number of remaining valid table pages is included in a header of the mapping page; and
   if the number of the remaining valid system data pages satisfies a threshold:
   copying the valid system data pages of the first set to a third region of the non-volatile memory array; and
   freeing the first region,
   wherein the method is performed under the control of the controller.

22. The method of claim 21, wherein the non-volatile memory array further comprises a plurality of additional regions, and wherein the method further comprises:
   determining a region that includes the smallest amount of valid system data pages of any region of the non-volatile memory array where system data is stored;

copying the valid system data pages of the determined region to a third region of the non-volatile memory array; and freeing the determined region.

23. The method of claim 21, further comprising generating mapping information indicating non-volatile memory array locations in which at least some of the plurality of pages storing system data are located, wherein the mapping information reduces a time needed for reconstruction of at least a part of the system data.

24. The method of claim 21, wherein the system data comprises a logical to physical address mapping table.

25. The method of claim 1, wherein the mapping page is stored in the third region along with the copied valid table pages.

* * * * *